United States Patent Office 3,630,982
Patented Dec. 28, 1971

3,630,982
SEALING COMPOSITION WITH IMPROVED SEAL EFFICIENCY
James E. Matherly, Elizabethtown, Ky., assignor to Dow Corning Corporation, Midland, Mich.
No Drawing. Filed Mar. 18, 1970, Ser. No. 20,865
Int. Cl. C08g 51/22, 51/04
U.S. Cl. 260—29.1 SB                          4 Claims

ABSTRACT OF THE DISCLOSURE

A mixture of poly-3,3,3-trifluoropropylmethyl-siloxane fluid, poly-3,3,3-trifluoropropylmethylsiloxane gum, a silica filler, an extending filler, a polytetrafluoroethylene resin and a polytetrafluoroethylene telomer is useful as a sealing composition, such as for fuel tanks.

---

This invention relates to a sealing composition. More particularly, this invention relates to a non-curing sealing composition for sealing or resealing fuel tanks such as the integral fuel tanks designed for groove-injection type sealing found in the wings of jet aircraft.

As the advances in the jet aircraft construction and requirements change to meet demands of performance, the fuel tank construction and materials also must change to meet the demands of performance. Whereas the sealant composition described in U.S. Pat. No. 3,192,175 was suitable to meet the construction requirements of fuel tanks of jet aircraft designed in the past, it fails to meet the construction requirements for fuel tanks of jet aircraft being designed at present. The present invention meets the requirements for the construction of fuel tanks of jet aircraft of present design.

This invention relates to a sealing composition having an extrusion plasticity of from 200 to 600 pounds and consisting essentially of 100 parts by weight of a poly-3,3,3-trifluoropropylmethylsiloxane having a viscosity of from 40,000 to 150,000 cs. at 25° C., from 5 to 150 parts by weight of a poly-3,3,3-trifluoropropylmethylsiloxane gum, from 5 to 50 parts by weight of a finely divided reinforcing silica filler having a surface area of at least 100 square meters per gram, from 50 to 250 parts by weight of an inorganic extending filler having an average particle size of less than 20 microns, from 2 to 6 parts by weight of a polytetrafluoroethylene resin having an average particle size of less than one micron and from 20 to 100 parts by weight of a polytetrafluoroethylene telomer having a molecular weight of from 10,000 to 50,000.

The poly-3,3,3-trifluoropropylmethylsiloxanes having a viscosity of from 40,000 to 150,000 cs. at 25° C., preferably from 100,000 to 150,000 cs. at 25° C. are well known in the art. These fluids are satisfactory in the present composition, however, sealing compositions having a poly-3,3,3-trifluoropropylmethylsiloxane fluid with a viscosity less than 40,000 cs. at 25° C. do not have the seal efficiency as desired whereas viscosities greater than 150,000 cs. at 25° C. are impractical to prepare and use. Since the sealing composition also contains a gum, the viscosities of the fluid greater than 150,000 cs. at 25° C. would make the final sealing composition too stiff. The poly-3,3,3-trifluoropropylmethylsiloxane gums, where a gum is a siloxane having a viscosity greater than 1,000,000 cs. at 25° C., are well known in the art. Both the gum and the fluid can contain small amounts, less than 10 mol percent, of other siloxane units such as dimethylsiloxane, phenylmethylsiloxane, bis-3,3,3-trifluoropropylsiloxane, diphenylsiloxane and phenylvinylsiloxane. The gum and the fluid are endblocked with hydroxyl radicals or triorganosiloxy units such as trimethylsiloxy, 3,3,3-trifluoropropyldimethylsiloxy, vinyldimethylsiloxy and diphenylmethylsiloxy units. The poly-3,3,3-trifluoropropylmethylsiloxane gum can be present in an amount of from 50 to 150 parts by weight per 100 parts by weight of the poly-3,3,3-trifluoropropylmethylsiloxane fluid, preferably from 75 to 125 parts by weight.

The finely divided reinforcing silica filler can be any of the well known reinforcing silicas such as fume silica, silica aerogel, silica xerogel, which have a surface area of at least 100 square meters per gram. These reinforcing silica fillers can be treated silica fillers which are also well known reinforcing silica fillers. The reinforcing silica fillers can be treated with hexamethylcyclotrisiloxane, hexamethyldisilazane, trimethylchlorosilane, dimethyldimethoxysilane, hexamethyldisiloxane and other well-known methods of treating reinforcing silica fillers. The reinforcing silica filler can be present in an amount of from 5 to 50 parts by weight per 100 parts by weight of the poly-3,3,3-trifluoropropylmethylsiloxane, preferably from 5 to 30 parts by weight.

An inorganic extending filler can be any of those extending fillers conventionally used in silicone compositions such as finely divided quartz, diatomaceous earth, metal oxides such as titania, alumina, metal carbonates such as calcium carbonate, metal silicates such as aluminum silicate, zirconium silicate, lithium aluminum silicate and the like. These inorganic extending fillers suitable for the sealing composition of the present invention have a particle size of less than 20 microns, preferably less than 10 microns. The amount of inorganic extending filler present in the sealing composition can be from 50 to 250 parts by weight per 10 parts by weight of the poly-3,3,3-trifluoropropylmethylsiloxane fluid, preferably from 100 to 200 parts by weight.

The polytetrafluoroethylene resins are commercially available materials which have an average particle size of less than one micron, preferably less than 0.75 micron. The polytetrafluoroethylene resin can be present in an amount of from 2 to 6 parts by weight per 100 parts by weight of the poly-3,3,3-trifluoropropylmethylsiloxane. Amounts of polytetrafluoroethylene outside the above-defined range provide unsatisfactory properties in the sealing composition of the present invention, such as loss of adhesion, loss of seal efficiency, loss of extrudability and the like.

The polytetrafluoroethylene telomers suitable for the sealing composition of the present invention have a molecular weight of from 10,000 to 50,000, preferably from 20,000 to 40,000. These polytetrafluoroethylene telomers are well known and are commercially available. The polytetrafluoroethylene telomers can be present in an amount of from 20 to 100 parts by weight per 100 parts by weight of the poly-3,3,3-trifluoropropylmethylsiloxane fluid, preferably from 25 to 50 parts by weight.

The sealing compositions of this invention are non-curing and have an extrusion plasticity as determined by article 3.6 of Military Specification 81323 of 200 to 600, preferably from 300 to 450.

The present invention also relates to a method for preparing the sealing composition comprising mixing the poly-3,3,3-trifluoropropylmethylsiloxane fluid and the reinforcing silica, adding the polytetrafluoroethylene resin in the form of an aqueous dispersion having 50 to 70 weight percent polytetrafluoroethylene, and the polytetrafluoroethylene telomer in a halogenated hydrocarbon solvent, and thereafter mixing and heating whereby the water and halogenated hydrocarbon solvent are removed and a homogeneous mixture is obtained, milling the resulting composition with the poly-3,3,3-trifluoropropylmethylsiloxane gum and thereafter adding the inorganic extending filler and milling the final composition to provide a homogeneous mixture.

This method for the preparation of the sealing composition of the present invention is the best method of preparing such compositions. In view of the highly viscous nature of the composition, the mixing is carried out by an ordinary mechanical stirring mixer. The polytetrafluoroethylene resin is added in the form of an aqueous dispersion which readily provides a homogeneous mixture. Powdered polytetrafluoroethylene cannot be satisfactorily mixed to provide a homogeneous mixture with an ordinary mechanical stirring mixer, but requires a high shear mixing device such as a mill. The polytetrafluoroethylene telomer in a halogenated hydrocarbon solvent, such as trichlorotrifluoroethane is added and mixed into the composition. The order of addition of the polytetrafluoroethylene resin dispersion and the polytetrafluoroethylene telomer solution is not critical in that either one or the other can be added first. At this time the composition is heated to remove the halogenated hydrocarbon solvent and water. Once the solvent and water have been removed, the devolatized composition is placed on a rubber mill and the poly-3,3,3-trifluoropropylmethylsiloxane gum is added and milled into the composition. Finally, the inorganic extending filler is added and the milling is continued until the resulting sealing composition is a homogeneous mixture. The mixing and milling is carried out at ambient conditions, except for the heating to remove the solvent and water wherein temperatures up to 130° C. can be used.

The sealing composition of the present invention is particularly suitable for use in sealing and resealing integral fuel tanks designed for groove-injection type sealing. The sealing composition of the present invention has an improved seal efficiency as determined by article 3.10 of Military Specification 81323.

The following examples are for illustrative purposes only and should not be construed as limiting the present invention which is properly delineated in the claims. All parts are parts by weight unless otherwise stated.

EXAMPLE 1

To 100 parts of a hydroxyl endblocked poly-3,3,3-trifluoropropylmethylsiloxane having a viscosity of about 130,000 cs. at 25° C. in a mixer, 10 parts of a reinforcing silica having a surface area greater than 100 square meters per gram and being treated with hexamethylcyclotrisiloxane was added and mixed. To this mixture, 400 parts of a trichlorotrifluoroethane solution of polytetrafluoroethylene telomer having an average molecular weight of about 30,000 and having 7.5 weight percent polytetrafluoroethylene telomer was added and mixed permitting the trichlorotrifluoroethane to evaporate. To this mixture, 6.7 parts of an aqueous dispersion of 60 weight percent polytetrafluoroethylene resin having a particle size of 0.05 to 0.5 micron was added and mixed to form a homogeneous mixture. The resulting mixture was then heated to 110° C. under vacuum for one hour to remove any remaining trichlorotrifluoroethane and water. The mixture was cooled and milled with two passes on a three roll mill. To this milled mixture, 100 parts of a vinyldimethylsiloxy endblocked poly-3,3,3-trifluoropropylmethylsiloxane gum having a viscosity greater than 1,000,000 cs. at 25° C. was added and milled to form a homogeneous blend. To the resulting mixture, 150 parts of finely divided quartz having a particle size of less than 5 microns was added and milling was continued until a homogeneous blend of a sealing composition resulted.

The following properties were determined on the sealing composition in accordance with Military Specification 81323, specific gravity in accordance with article 3.4, adhesion in accordance with article 3.8, non-volatile content in accordance with article 3.5, extrusion plasticity in accordance with article 3.6, fuel resistance in accordance with article 3.7 and the seal efficiency in accordance with article 3.10.

The sealing composition had a specific gravity of 1.72, 100% cohesive failure, 99.6 weight percent non-volatiles, an extrusion plasticity of 340 pounds, and a swell of 15.8 percent. The seal efficiency was determined by exposing the sealing composition in a jig to jet fuel under 5 p.s.i. pressure and subjecting to 120° F. for 100 hours followed by 10 hours at 160° F. and one hour at 180° F. The jet fuel was then removed and the jig was exposed in a dry oven for 20 hours at 225° F. followed by 10 hours at 310° F. and one hour at 350° F. throughout a 5 p.s.i. pressure was maintained. Thereafter, the pressure was increased to 10 p.s.i. for one minute. This was one cycle. Any leakage after the fuel was drained or after the final heating, constituted failure. The cycles were repeated until failure occurred or a sufficient number of cycles passed to be acceptable. The sealing composition described above passed 9 cycles without failure.

EXAMPLE 2

Example 1 was repeated except in place of the hexamethylcyclotrisiloxane treated reinforcing silica, a hexamethyldisilazane treated reinforcing silica was used. The properties were determined as described in Example 1. This sealing composition had a specific gravity of 1.65, 100% cohesive failure, 99.7 weight percent non-volatiles, an extrusion plasticity of 340 pounds, a swell of 18.5 percent and passed 9 cycles in the seal efficiency without failure.

EXAMPLE 3

Example 1 was repeated, except 8.3 parts of the polytetrafluoroethylene resin dispersion and the reinforcing silica filler was treated with tris-3,3,3-trifluoropropyltrimethylcyclotrisiloxane instead of hexamethylcyclotrisiloxane was used. The sealing composition had a specific gravity of 1.635, 100% cohesive failure, 99.8 weight percent non-volatiles, an extrusion plasticity of 320 pounds and a swell of 20.9 percent.

EXAMPLE 4

Example 3 was repeated, except 3.3 parts of the polytetrafluoroethylene resin dispersion and 150 parts of lithium aluminum silicate replaced the finely divided quartz. The sealing composition had a specific gravity of 1.66, 100% cohesive failure, 100 weight percent non-volatiles, an extrusion plasticity of 255 pounds and a swell of 21.4 percent.

EXAMPLE 5

Example 1 was repeated, except 3.3 parts of the polytetrafluoroethylene resin dispersion and 666.7 parts of the polytetrafluoroethylene telomer in trichlorotrifluoroethane was used. The sealing composition had a specific gravity of 1.64, 100% cohesive failure, 99.2 weight percent non-volatiles, an extrusion rate of 230 pounds, a swell of 19.1 percent and passed 7 cycles without failure.

EXAMPLE 6

Example 5 was repeated, except 533.3 parts of the polytetrafluoroethylene telomer in trichlorotrifluoroethane was used. The sealing composition had a specific gravity of 1.62, 100% cohesive failure, 99.4 weight percent non-volatiles, an extrusion plasticity of 232 pounds, a swell of 20.3 percent and passed 8 cycles without failure.

EXAMPLE 7

Example 5 was repeated, except 400 parts of the polytetrafluoroethylene telomer in trichlorotrifluoroethane was used. The sealing composition had a specific gravity of 1.62, 100% cohesive failure, 100 weight percent non-volatiles, an extrusion plasticity of 245 pounds and a swell of 19.4 percent.

EXAMPLE 8

Example 2 was repeated, except the hydroxyl endblocked poly-3,3,3-trifluoropropylmethylsiloxane had a viscosity of 50,000 cs. at 25° C. and 5 parts of the polytetrafluoroethylene resin was used. The sealing composition had a specific gravity of 1.63, 100% cohesive failure, 100 weight percent non-volatiles and an extrusion plasticity of about 250 pounds.

EXAMPLE 9

A sealing composition was prepared in the manner described in U.S. Pat. No. 3,192,175 for comparative purposes. A mixture of 20 parts of a hydroxyl endblocked poly-3,3,3-trifluoropropylmethylsiloxane having a viscosity of 40,000 cs. at 25° C. and 80 parts of a hydroxyl endblocked poly-3,3,3-trifluoropropylmethylsiloxane having a viscosity of 130,000 cs. at 25° C., 10 parts of a reinforcing silica filler having a surface area greater than 100 square meters per gram and treated with hexamethylcyclotrisiloxane, 2 parts of titanium dioxide filler and 2 parts of a powdered polytetrafluoroethane resin having a particle size of about 0.2 micron was prepared by milling on a three roll rubber mill. To the resulting milled mixture 100 parts of a poly-3,3,3-trifluoropropylmethylsiloxane gum having a viscosity greater than 1,000,000 cs. at 25° C. and 150 parts of finely divided quartz having a particle size of less than 5 microns was milled into the mixture. The resulting sealing composition was tested in accordance with the procedure described in Example 1. The sealing composition had a specific gravity of 1.58, 100% cohesive failure, 99.5 percent non-volatiles, an extrusion plasticity of 220 pounds, a swell of 21.03 percent and failed after 3 cycles of the seal efficiency test.

That which is claimed is:

1. A sealing composition having an extrusion plasticity of from 200 to 600 pounds and consisting essentially of 100 parts by weight of a poly-3,3,3-trifluoropropylmethylsiloxane having a viscosity of from 40,000 to 150,000 cs. at 25° C., from 50 to 150 parts by weight of a poly-3,3,3-trifluoropropylmethylsiloxane gum, from 5 to 50 parts by weight of a finely divided reinforcing silica filler having a surface area of at least 100 square meters per gram, from 50 to 250 parts by weight of an inorganic extending filler having an average particle size of less than 20 microns, from 2 to 6 parts by weight of a polytetrafluoroethylene resin having an average particle size of less than one micron and from 20 to 100 parts by weight of a polytetrafluoroethylene telomer having a molecular weight of from 10,000 to 50,000.

2. The sealing composition in accordance with claim 1 in which the poly-3,3,3-trifluoropropylmethylsiloxane has a viscosity of from 100,000 to 150,000 cs. at 25° C., the poly-3,3,3-trifluoropropylmethylsiloxane gum is present in an amount of from 75 to 125 parts by weight, the finely divided reinforcing silica filler is present in an amount of from 5 to 30 parts by weight, the inorganic extending filler is present in an amount of from 100 to 200 parts by weight and has a particle size of less than 10 microns and the polytetrafluoroethylene telomer having a molecular weight of from 20,000 to 40,000 and is present in an amount of from 25 to 50 parts by weight.

3. The sealing composition in accordance with claim 2 in which the extrusion plasticity is from 300 to 450 pounds.

4. A method for preparing a sealing composition comprising
   mixing 100 parts by weight of a poly-3,3,3-trifluoropropylmethylsiloxane having a viscosity of from 40,000 to 150,000 cs. at 25° C. and from 5 to 50 parts by weight of a finely divided reinforcing silica filler having a surface area of at least 100 square meters per gram,
   adding from 2 to 6 parts by weight of a polytetrafluoroethylene resin having an average particle size of less than one micron in the form of an aqueous dispersion having 50 to 70 weight percent polytetrafluoroethylene and from 20 to 100 parts by weight of a polytetrafluoroethylene telomer having a molecuular weight of from 10,000 to 50,000 in a halogenated hydrocarbon solvent, thereafter
   mixing and heating the resulting mixture whereby the water and halogenated hydrocarbon solvent are removed and a homogeneous mixture is obtained,
   milling the resulting homogeneous mixture with from 50 to 150 parts by weight of a poly-3,3,3-trifluoropropylmethylsioxane gum and thereafter adding from 50 to 250 parts by weight of an inorganic extending filler having an average particle size of less than 20 microns and thereafter
   milling the composition to obtain a homogeneous blend of a sealing composition having an extrusion plasticity of from 200 to 600 pounds.

References Cited
UNITED STATES PATENTS

| | | | |
|---|---|---|---|
| 3,192,175 | 6/1965 | Russell | 260—29.1 SB |
| 3,449,290 | 6/1969 | Foster | 260—37 SB |

MORRIS LIEBMAN, Primary Examiner

L. T. JACOBS, Assistant Examiner

U.S. Cl. X.R.

260—37 SB; 827